July 22, 1941.   D. O. DOTSON   2,249,889
VEHICLE WHEEL
Filed March 9, 1940   2 Sheets-Sheet 1
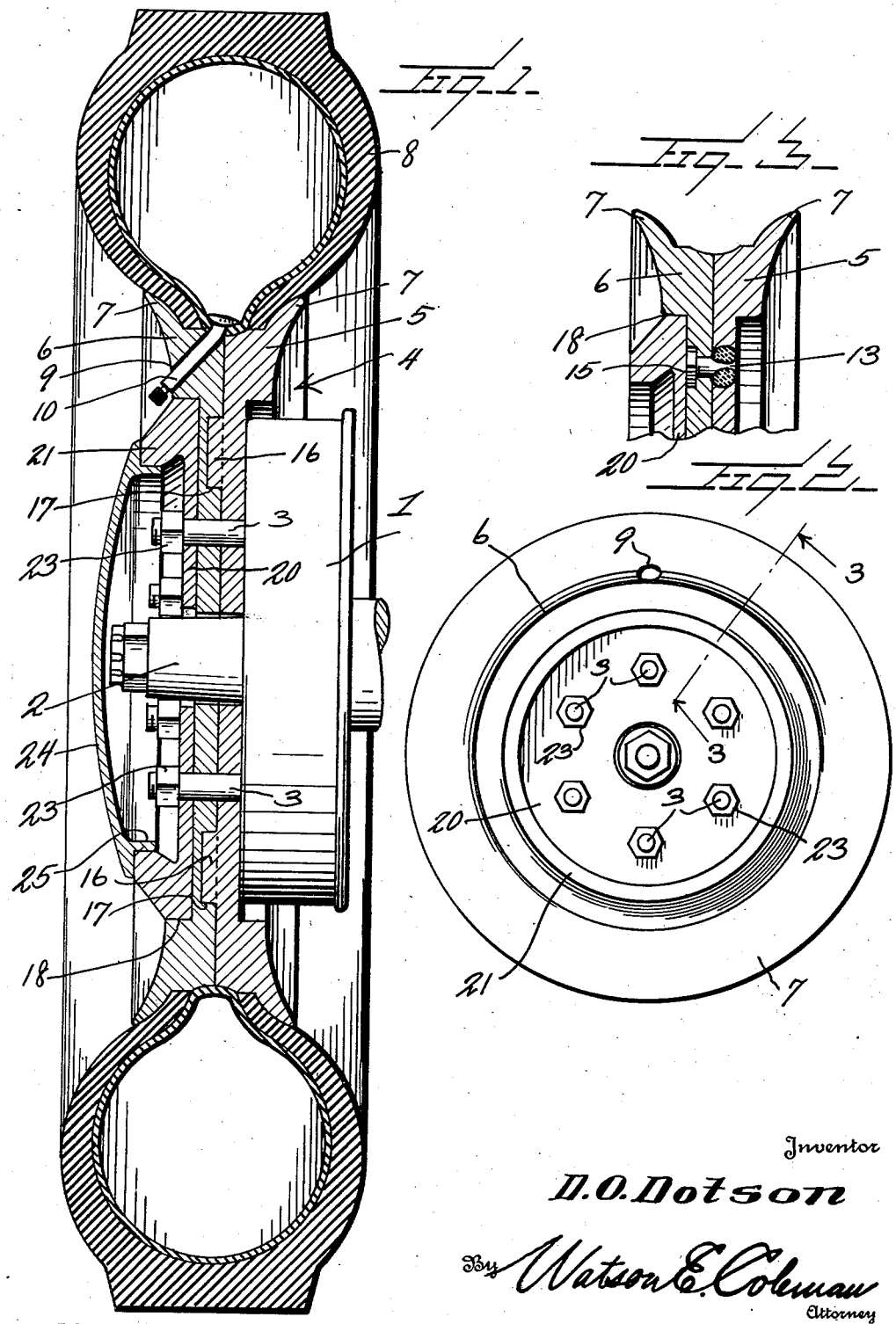
Inventor
D. O. Dotson
By Watson E. Coleman
Attorney July 22, 1941.    D. O. DOTSON    2,249,889
VEHICLE WHEEL
Filed March 9, 1940    2 Sheets-Sheet 2

Inventor
D. O. Dotson
By Watson E. Coleman
Attorney

Patented July 22, 1941

2,249,889

UNITED STATES PATENT OFFICE 2,249,889

VEHICLE WHEEL

Donald Orlo Dotson, Adams County, Iowa

Application March 9, 1940, Serial No. 323,225

3 Claims. (Cl. 301—63)

This invention relates to improvements in vehicle wheels and pertains particularly to wheels of the type having removable inflated or pneumatic tires.

The present invention has for its primary object to provide an improved penumatic tire wheel which is designed in such manner that the removal of the tire from the wheel is facilitated by reason of the construction of the wheel in two separably connected portions whereby the wheel can be divided in a plane perpendicular to its axis to permit the tire casing to be slipped on or off easily and quickly.

Another object of the invention is to provide a wheel of the above stated character in which novel means is employed for coupling together the two separable and complementary parts whereby strain upon holding bolts is prevented and the parts of the wheel are maintained firmly in the required assembled relation.

Still another object of the invention is to provide in a wheel construction of the character stated, a novel means of mounting the wheel upon an axle and of covering the mounting means so that the outside face of the wheel will present a neat and attractive appearance and will not show bolt heads or other fastening elements.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 is a view in axial section through a wheel constructed in accordance with the present invention and a tire mounted thereon.

Fig. 2 is a view in elevation of the outer side of the wheel with the hub cap removed.

Fig. 3 is a sectional view on the line 3—3 of Fig. 2.

Figure 4:
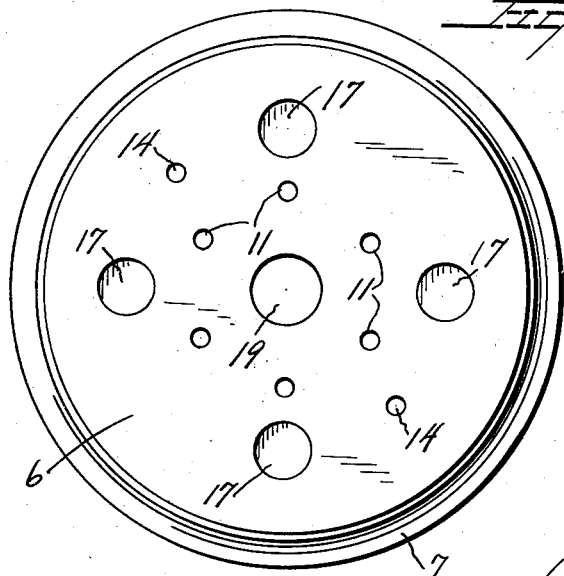
Fig. 4 is a view in side elevation of one face of one of the two major units of the wheel showing the lug receiving recesses.
Figure 6:
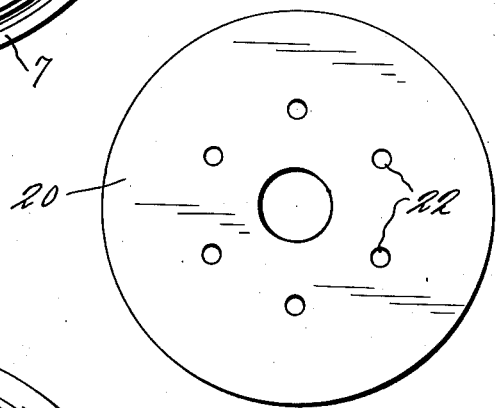
Fig. 6 is a view in plan of the shield plate or disk.
Figure 5:
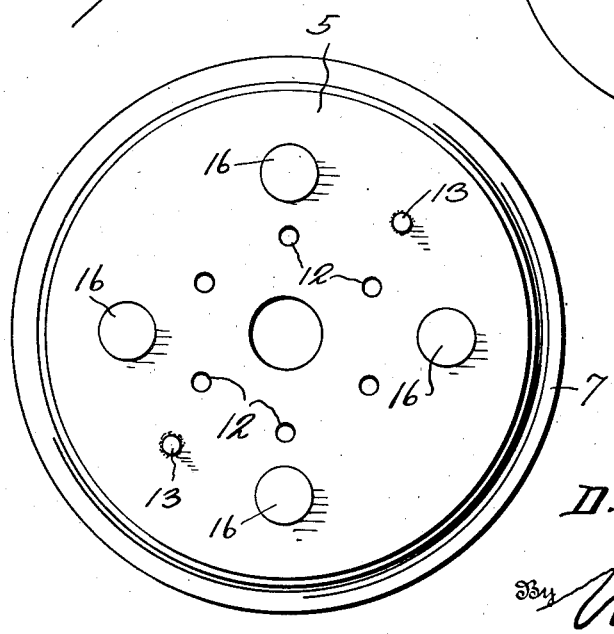
Fig. 5 is a view in elevation of one face of the other one of the two major units showing the centering lugs.

Referring now more particularly to the drawings, the numeral 1 designates the usual brake drum housing of a motor vehicle through which extends the wheel hub 2. The brake housing 1 carries in the usual manner a series of axially extending stud bolts 3 by means of which the wheel structure is secured in position.

In carrying out the present invention, the wheel indicated generally by the numeral 4 consists of two disk portions 5 and 6, each of which is formed to provide a peripheral flange 7, which flanges coact when the disk portions are in concentric relation, to provide a rim for a tire cascentric relation, to provide a rim for a tire casing 8. The outer disk portion 6 of the wheel is provided with a suitable aperture or passage 9 to receive the inner tube valve stem 10 which extends through to the outside of the wheel.

The two disk portions 5 and 6 of the wheel are of exactly the same diameter and each is provided with a series of bolt openings which, in the set up wheel are alined to receive the supporting bolts 3, the openings of the disk portion 6 being indicated at 11 and those in the portion 5 being indicated at 12. One of the disk portions, here shown as the inner portion 5, has secured to the inner or covered face thereof stud bolts 13 which extend through apertures 14 in the adjacent portion to receive holding nuts 15, as shown in Fig. 3, and by means of these stud bolts, the two portions 5 and 6 of the wheel are securely coupled together.

In order that no relative movement may occur between the portions 5 and 6 which would produce strain or shearing action upon the bolts 13, one of the two portions of the wheel is provided with a number of studs 16 upon its inner or central face and the other portion has its inner or central face provided with receiving recesses 17 for these studs. Thus when the two portions 5 and 6 are in face to face relation, the studs and recesses will interconnect to couple the two parts or portions securely together.

The outer side of the wheel portion 6 is provided with a concentric recess 18 and the two portions 5 and 6 are, naturally, provided with central openings 19 through which the hub 2 may extend. The recess 18 has disposed therein the shield disk 20 which upon its outer side is enlarged to form an encircling rim 21, thus making the disk in the form of an outwardly opening dish which positions in the recess 18 at the outer side of the wheel portion 6, and this disk has suitable apertures 22 to receive the stud bolts 3. The outer ends of the stud bolts 3 have thereon the securing nuts 23 which bear against the outer side of the disk 20 and lie within the area defined by the rim 21.

The numeral 24 designates a hub cap of circular form having a retaining flange 25 which frictionally engages within the rim 21 of the disk 20. Any suitable locking or securing means may be provided between the flange 25 of the hub cap and the rim 21 of the covered disk to hold the hub cap in position, and it will be readily seen that this hub cap functions to cover the end of the wheel hub as well as the ends of the stud bolts upon which the securing nuts 23 are mounted.

From the foregoing, it will be readily apparent that in assembling the wheel structure or when applying a tire to the wheel structure, the two disk portions 5 and 6 will be brought together from opposite sides of the tire so as to engage the inner part of the tire between the flanges 7, the studs 16 connecting in the recesses 17 to retain the disk portions in coaxial relation with their inner faces in abutting relation. The stud bolts 13 carried by one portion will extend through the apertures 14 of the other portion to receive the securing nuts, thus tightly fastening the two portions of the wheel together. The tire casing carrying joined portions of the wheel are then put in position on the hub with the bolts 3 extending through the alined apertures 11—12, after which the shield disk or plate 20 is placed in position and the securing nuts 23 applied. This completes the assembly of the wheel with the exception of the application of the hub cap which can be placed in position in the usual manner.

From the foregoing, it will be readily apparent that with a wheel constructed in accordance with the present invention, a tire may be put on or taken off much more easily and with less time consumption than is the case with wheels of the type at present employed where the tire must be forced over the flanges of the wheel rim. This procedure not only is time consuming and tiresome, but is not good for the tire casing, whereas in the present case the application of the tire casing or its removal from the wheel is not tiring to the operator and cannot result in damage to the casing.

What is claimed is:

1. A tire casing supporting vehicle wheel, comprising a pair of concentrically related disk bodies having peripheral flanges cooperating to form a tire retaining rim, said bodies having alined central apertures for the reception of a wheel hub and alined apertures encircling the central apertures for the reception of supporting bolts, separable means securing said disk bodies together, one of said disk bodies having a recess in its outer side through which said separable means is accessible, a centrally apertured disk formed to fit in said recess and covering said separable means and having apertures to receive said supporting bolts, said disk having a circular recess in its outer side, and a hub cap designed to cover the recessed outer side of the last-mentioned disk and having an annular flange adapted to fit and be secured in the circular recess of the last-mentioned disk.

2. A tire casing supporting vehicle wheel, comprising a pair of concentrically related disk bodies having peripheral flanges cooperating to form a tire retaining rim, said bodies having alined central apertures for the reception of a wheel hub and alined apertures encircling the central apertures for the reception of supporting bolts, one of said disk bodies having a recess in its outer side, a centrally apertured disk formed to fit in said recess and having apertures to receive said supporting bolts, said disk having a circular recess in its outer side, a hub cap designed to cover the recessed outer side of the last-mentioned disk and having an annular flange to be secured in the said circular recess, bolt means coupling the disk bodies together and opening into the recess in the first-mentioned disk body, said bolt means being covered by the last-mentioned disk, and means forming an interlocking coupling between the disk bodies for preventing relative rotary movement therebetween.

3. A pneumatic tire supporting vehicle wheel comprising two disk bodies arranged in abutting coaxial relation, each of said bodies having a central hub receiving aperture and a series of bolt receiving apertures, one of said bodies having in the said abutting face thereof a plurality of recesses arranged around said central aperture, a plurality of studs formed integrally with the said abutting face of the other one of the bodies for engagement in said recesses, a plurality of stud bolts secured in the said abutting face of one of the bodies and extending through apertures in the adjacent body, the said adjacent body having a circular recess formed in its outer face into which the stud bolt receiving aperture opens, each of said stud bolts having a securing nut thereon, a cover disk insertible into said circular recess and having a circular recess in its outer side defined by an annular rim, said cover disk covering said stud bolts and having a central hub receiving aperture and a series of apertures designed to receive the first-mentioned bolts, and a hub cap formed to cover the area defined by the rim of said cover disk and having an annular flange for extension into and to be secured to said cover disk rim.

DONALD ORLO DOTSON.